United States Patent
Tanis et al.

[11] Patent Number: 6,165,369
[45] Date of Patent: Dec. 26, 2000

[54] STABLE SUSPENSIONS OF SOLIDS IN METAL SALT SOLUTIONS FOR USE IN WATER TREATMENT

[75] Inventors: James Nelson Tanis, Ridgefield, Conn.; Jawahar Chunilal Parekh, Livingston, N.J.

[73] Assignee: General Chemical Corporation, Del.

[21] Appl. No.: 09/334,243

[22] Filed: Jun. 16, 1999

[51] Int. Cl.$^7$ .................................................. C02F 1/52
[52] U.S. Cl. .................... 210/705; 210/723; 210/800; 252/175
[58] Field of Search ................................ 210/723, 705, 210/800; 252/175

[56] References Cited

U.S. PATENT DOCUMENTS

| | | | |
|---|---|---|---|
| 4,076,615 | 2/1978 | Olesen | 210/5 |
| 4,530,765 | 7/1985 | Sabherwal | 210/663 |
| 4,882,070 | 11/1989 | Wardell | 210/727 |
| 4,981,593 | 1/1991 | Priestley | 210/613 |
| 5,320,773 | 6/1994 | Perman | 252/181 |
| 5,573,674 | 11/1996 | Lind | 210/702 |
| 5,681,475 | 10/1997 | Lamensdorf | 210/666 |
| 5,830,388 | 11/1998 | Kigel | 252/358 |

OTHER PUBLICATIONS

General Chemical Water Chemicals Group Brochure, 1997.

*Primary Examiner*—Chester T. Barry
*Attorney, Agent, or Firm*—Arthur J. Plantamura

[57] ABSTRACT

Stable suspensions can be made from acidic metal salt solutions and finely divided acid-insoluble solid particles that have a particle size of less than twenty-five microns, preferably less than ten microns, and most preferably, about one micron. These suspensions can be used to treat surface waters to remove organic materials therefrom. The suspension forms a floc that includes the solid particles and organic materials, which floc rapidly settles out of solution, leaving purified water as the supernatant liquid.

19 Claims, 2 Drawing Sheets

STABLE SUSPENSIONS OF SOLIDS IN METAL SALT SOLUTIONS FOR USE IN WATER TREATMENT

This invention relates to a method for removing contaminants from surface water supplies, and to stable suspensions of acidic metal salt solutions that include finely divided acid-insoluble solid particles for treating water supplies.

BACKGROUND OF THE INVENTION

Acidic metal salt solutions, such as aluminum sulfate ($Al_2(SO_4)_3 \cdot 14H_2O$) solution, have long been employed to remove turbidity, color and suspended particles, as well as organic and microbiological contaminants, from surface waters. Surface waters as employed herein include municipal water supplies, river water, lake waters, reservoirs and the like. Aluminum sulfate, or alum, is readily available, either as a solid or as a strongly acidic 48.5% by weight solution. When it is diluted with surface water, it can function as a coagulant, flocculent, precipitant and emulsion breaker. As a coagulant, alum removes algae in the water; algae take up and thus remove oxygen from the water (known as biochemical oxygen demand or BOD) and thus pose a danger to fish. It forms an insoluble precipitate or floccule, i.e., a floc, from impurities in the water. The floc grows in size as it attracts suspended and colloidal particles and organic compounds present in the water. The floc settles out of the water over time and can then be removed, as by decanting or filtering the water.

Various additives in combination with the acidic metal salt solution that aid in the removal of contaminants present in water are known, including the addition to the acidic metal salt of various organic polymers, and inorganic materials such as calcium chloride, activated carbon, silicates, phosphates, sodium hydroxide and the like. One prior art mixture of this kind is disclosed in U.S. Pat. No. 4,076,615 to Olesen et al.

Recently the United States government and various state and local agencies have increased their requirements for water purity, particularly with respect to removal of organic materials. Thus more restrictions have been placed on the organic content of drinking water and waste waters, and federal and state regulations are expected to require very low levels of organic material. In many situations it may be expected that the current and prior art water treatments and current practices, as more stringent limits are legislated, may be unable to meet the new requirements and higher standards for water purity economically.

Thus there is an important need for an improved means of removing contaminants from water so as to comply with anticipated more rigorous requirements for clean water.

SUMMARY OF THE INVENTION

We have found that the addition to an acidic soluble metal salt solution, of the kind that have been used in water treatment, of finely divided acid-insoluble solid particles forms a substantially stable suspension that is highly effective as a coagulant aid, and for absorbing and removing contaminants from surface waters. The finely divided acid-insoluble solid particles can be mixed with dry acidic metal salts and the acidic metal salt dissolved in water just prior to use. Alternatively, a stable suspension of an acidic metal salt solution and the finely divided acid-insoluble solid particles can be preformed for shipment and use at the treatment site. The solid particles are milled so as to ensure a particle size on the order of twenty-five microns or less to make the stable suspension in the aqueous solutions of the acidic metal salt. Treatment of surface waters with these suspensions reduces the amount of contaminants in water to a greater extent than the use of conventional soluble metal salts alone.

DETAILED DESCRIPTION OF THE INVENTION

Figure 1:
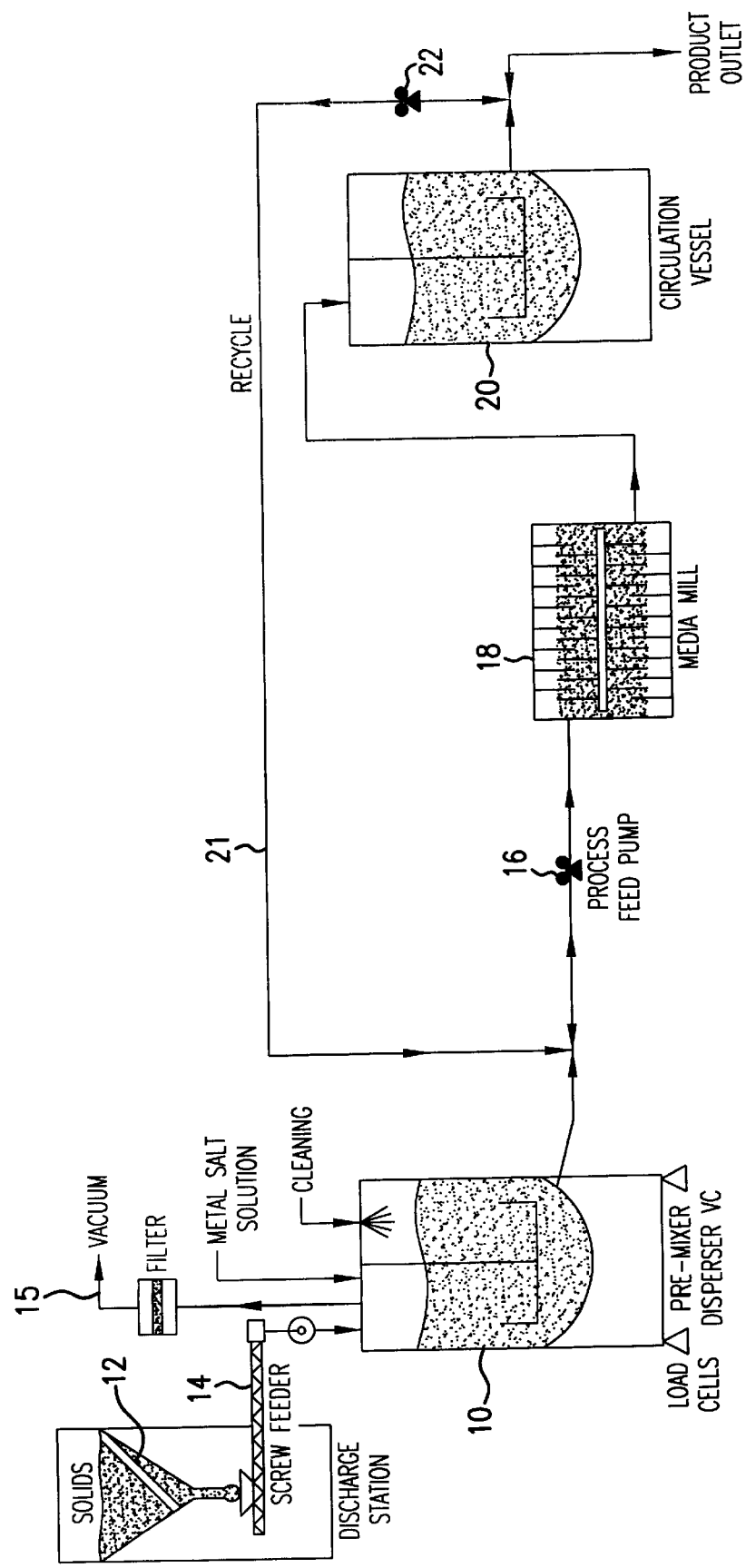
FIG. 1 is a schematic flow diagram of the manufacture of the aqueous stable suspensions of the invention.

The present method is directed to treating surface waters to reduce the amount of contaminants, particularly organic materials such as algae, some of the dissolved organics, colloidal materials, virus, bacteria and turbidity therein. A stable suspension is formed of a acidic soluble metal salt in solution and finely divided solid acid-insoluble particles having a particle size of less than about 25 microns, preferably less than about 10 microns, and most preferably about one micron. When the resulting suspension is added to the water to be treated, it forms a floc which has good settling characteristics. The floc is allowed to settle or precipitate out of solution; and the floc is separated from the treated water.

The stable suspensions of the invention have been demonstrated to substantially reduce the total organic carbon (TOC) content in treated waters, as is evidenced by a marked reduction of yellow coloration in the treated water.

In a typical application of the invention, the stable suspension of the finely divided acid-insoluble solid in an acidic metal salt solution is shipped to a site where it is to be used. The suspension is added to the water to be treated at a predetermined dosage and mixed. The resulting floc is allowed to settle. The presence of the acid-insoluble solid particles suspended in the acidic metal salt solution substantially enhances the performance of the metal salt's flocculating and clarification functions.

A stable suspension can be prepared from a solution of the acidic metal salt mixed with the acid-insoluble solid particles. A known suspension aid, such as the nonionic surfactant "Tween 20", may be added to inhibit the tendency of the solid particles to settle out of the suspension. The concentration of the metal salt in the present suspensions is about 5 to 50% by weight. The suspensions of the invention include from about 1–12% by weight of the acid-insoluble particles.

The acidic aqueous metal salt solutions can be made by dissolving a conventional amount, i.e., on the order of 5–50% by weight of the acidic metal salt in water, and then stirring in the finely divided acid-insoluble solid particles. The resulting suspension is generally shipped to a point of use where it can be fed to the water to be treated.

Alternatively, a concentrated acidic metal salt solution and the acid-insoluble particulates may be shipped separately to a site, and fed in metered mixed quantities to a pre-mixer/milling operation, and thereafter made available for introduction into the water to be treated.

Because the above suspensions, unless suitably milled, have been found to be relatively unstable, the mixture of the metal salt solution and acid-insoluble solid particles is milled sufficiently to reduce the particle size of the solid particles to the desired level, i.e., to a level that yields a suspension of practical stability.

By "stable suspension" is meant that less than about 25% of the finely divided acid-insoluble solid particles in the acidic metal salt solution settle out of solution in a period of about 6 weeks or longer when stored under ambient conditions, i.e., at 25° C.; and that any such settled particles can be readily resuspended by stirring, mixing or agitating the mixture prior to, or during the use or application of the suspension. Preferably not more than 15% of the solid particles should settle out of solution.

FIG. 1 is a flow diagram of one method of making a stable suspension of the invention. A concentrated solution (generally about 48.5% by weight) of aluminum sulfate (hereinafter alum) solution is added to a mixing tank 10. An insoluble solid, as further described hereinbelow, and having varying particle sizes from a powder to a granular material, is poured from a hopper 12 to a screw feed conveyor 14 that conveys the solid material into the mixing tank 10. A vacuum pump (not shown) removes excess air and other gases during the addition of the particulate solid material through a line 15. After stirring, the solid particles and the acidic alum solution are passed via a feed pump 16 to a media mill 18 where the acid-insoluble solid particles are ground to the desired particle size. In the case of activated carbon, particles having an average particle size on the order of 18–20 microns are ground in a media mill to an average particle size of about one micron in about 45 minutes. However, the milling time may vary with the solid to be ground. As a rule, a suitable particle size for particles to yield a stable suspension can be obtained by milling for an hour or less. The resultant stable suspension of acid-insoluble solid particles and the acidic metal salt solution thus milled is collected in a vessel 20 for storage while awaiting shipment. The suspension is stable for a period of time adequate for most uses involving the treatment of water to remove contaminants. Depending on the ultimate use and the transportation time lapse to the point of use, the milling time may be varied. Also, taking into consideration the suspension storage time before use of the suspension, appropriate agitation to re-suspend any settled particles in the vessel 20 may be necessary. Generally simple stirring is sufficient, but if required, the suspension can be recirculated via pump 22 and line 21 and re-milled in the media mill 18.

Various finely divided acid-insoluble solid suspension agents are commercially available and are useful herein, including bentonite clay, zeolites, silica, activated carbon and the like. Examples of commercially available finely divided acid-insoluble solid agents include activated carbon grades HB, HC and HR of Norrit Co. and precipitated amorphous silica, a product sold by The J. M. Huber Corporation under the trade name "Zeothix"® for example. In accordance with the invention, any of these finely divided acid-insoluble solid particles can be added, alone or in combination, to various acidic metal salt solutions to form stable suspensions. These finely divided solids are effective in removing various contaminants in water and can form a floc including the solid particles and contaminants present in the water to be purified. The amount of suspended finely divided solid added can vary widely, but in order to form a stable suspension, a maximum useful amount of solid particles is that amount that will stay suspended in solution for several weeks. That amount, in each particular case, depends on the viscosity and concentration of the metal salt solution to be used and the particle size and type of finely divided solid particles.

Finely divided activated carbon particles are particularly useful herein and can be added to various metal salt solutions to remove various contaminants, particularly organic materials. Activated carbon has long been used to remove colorants from sugar solutions, oils and the like, and for the clarification and decolorization of aqueous solutions. In like manner, finely divided activated carbon particles having a BET surface area in the range of about 500 to about 2000 $m^2/gm$, when mixed with a metal salt solution as described herein, can remove organic material from surface water. One of the advantages of the present method of adding activated carbon particles to metal salt solutions and then reducing the size of the carbon particles, or other particles, is that it is cleaner, i.e., more efficient and effective. The user is not required to handle very finely divided particles which may become suspended in air, and which can be hazardous to the user.

Suitable acidic metal salts for use herein include aluminum sulfate, aluminum chloride, polyaluminum chloride, aluminum chlorohydrate having the empirical formula $Al_2(OH)_xCl_{(6-x)}$, wherein x is greater than 0 and less than 6, and wherein x need not be an integer, polyaluminum silicate sulfate, ferric sulfate, ferrous sulfate, ferric chloride and other acidic metal salts used as primary coagulants.

The invention will be further illustrated using activated carbon particles as the suspended solid. Various grades of activated carbon may be suitably employed. However, the particle size of the finely divided insoluble solid affects the stability of the suspensions. In the case of activated carbon in metal salt solutions, we have found that particles on the order of about 20–25 microns and larger in size tend to settle out of suspension more quickly; thus the period during which stable suspensions are obtained is shortened. When a relatively unstable suspension is used to treat water, the effective functioning time of the treating suspension tends to be reduced. In order to form stable suspensions, i.e., wherein the carbon particles or other solids do not settle out of solution over a period of several weeks or longer, the particles should be reduced to a particle size below twenty-five (25) microns, preferably below ten (10) microns and most preferably to about one micron.

The concentration of the activated carbon or other insoluble particles in a metal salt solution is also important, as will be shown further hereinbelow.

In order to balance the stability of the suspension and the solid particle content thereof, a maximum of about 10% by weight of insoluble finely divided solids can be used. Preferably about 3 to 10% by weight is used, and most preferably, 4.5 to 8.0% by weight of the solids is incorporated into the metal salt solution. Quantities less than 3% by weight of solid particles however, may present difficulty in milling the particles to the desired particle size. Quantities significantly greater than 10% by weight may yield a viscosity for the mixture that is difficult to handle as a practical matter.

The particle size in microns of activated carbon particles after milling, using three different grades of carbon supplied by Norrit Americas Co. (Hydrodarco B, C and R, referred to as HB, HC and HR respectively), at different concentrations of carbon particles in solution and different residence times in a media mill are given below in Table I.

TABLE I

Residence time in media mill in minutes

| Carbon Conc. | 2.5% | | | 5.0% | | | 7.5% |
|---|---|---|---|---|---|---|---|
| Grade | HB | HC | HR | HB | HC | HR | HC |
| 10 Minutes | | | | | | | |
| Mean Particle Size | 1.3 | 1.07 | 1.1 | 1.0 | 1.0 | 1.04 | 1.059 |
| 90% of particles less than | 3.35 | 1.88 | 1.9 | 1.75 | 1.75 | 1.8 | 2.05 |
| 99% of particles less than | 18.4 | 2.98 | 3.03 | 2.75 | 2.8 | 2.9 | 3.8 |
| 30 Minutes | | | | | | | |
| Mean Particle Size | 0.74 | 0.65 | 0.69 | 1.08 | .62 | .63 | 0.56 |
| 90% of particles less than | 1.4 | 1.0 | 1.28 | 1.4 | 1.23 | 1.23 | 1.09 |
| 99% of particles less than | 2.09 | 1.8 | 1.85 | 2.09 | 1.73 | 1.73 | 1.50 |
| 45 Minutes | | | | | | | |
| Mean Particle Size | 0.60 | 0.55 | 0.61 | 0.56 | 0.52 | 0.54 | 0.48 |
| 90% of particles less than | 1.22 | 1.17 | 1.22 | 1.14 | 1.09 | 1.13 | 0.924 |
| 99% of particles less than | 1.72 | 1.67 | 1.72 | 1.62 | 1.59 | 1.66 | 1.36 |

In carbon concentrations of 5% and 7.5% by weight, the milled particles remained suspended as a thick viscous suspension in alum solution after storage at ambient conditions for at least 12 weeks. No significant settling out was apparent after this twelve week period. Thus it is believed these milled suspensions can be shipped in concentrated form to the site where they are to be used. They can be diluted as desired on site just prior to use.

After milling, the particle size distribution of a 7.5% activated carbon suspension in 48% alum solution was determined using a Laser Scattering Particle Distribution Analyzer manufactured by Hariba Instruments Inc, Irvine Calif. The suspending media used for suspending activated carbon suspension in the instrument's recirculating chamber was ethoxyethanol. The data is set forth below in Table II.

TABLE II

| Size, micron | % Frequency | % of particles less than |
|---|---|---|
| 1.729 | 0.28 | 100.00 |
| 1.509 | 0.93 | 99.71 |
| 1.318 | 2.30 | 98.77 |
| 1.150 | 3.72 | 96.46 |
| 1.004 | 4.44 | 92.74 |
| 0.877 | 5.11 | 88.29 |
| 0.765 | 6.89 | 83.18 |
| 0.668 | 9.48 | 76.28 |
| 0.583 | 12.12 | 66.80 |
| 0.509 | 13.44 | 54.68 |
| 0.445 | 12.82 | 41.23 |
| 0.388 | 11.17 | 28.41 |
| 0.339 | 8.61 | 17.23 |
| 0.296 | 5.05 | 8.6 |
| 0.258 | 2.23 | 3.55 |
| 0.225 | 0.87 | 1.32 |
| 0.197 | 0.33 | 0.45 |
| 0.172 | 0.11 | 0.11 |
| 0.150 | 0.00 | 0.00 |

Figure 2:
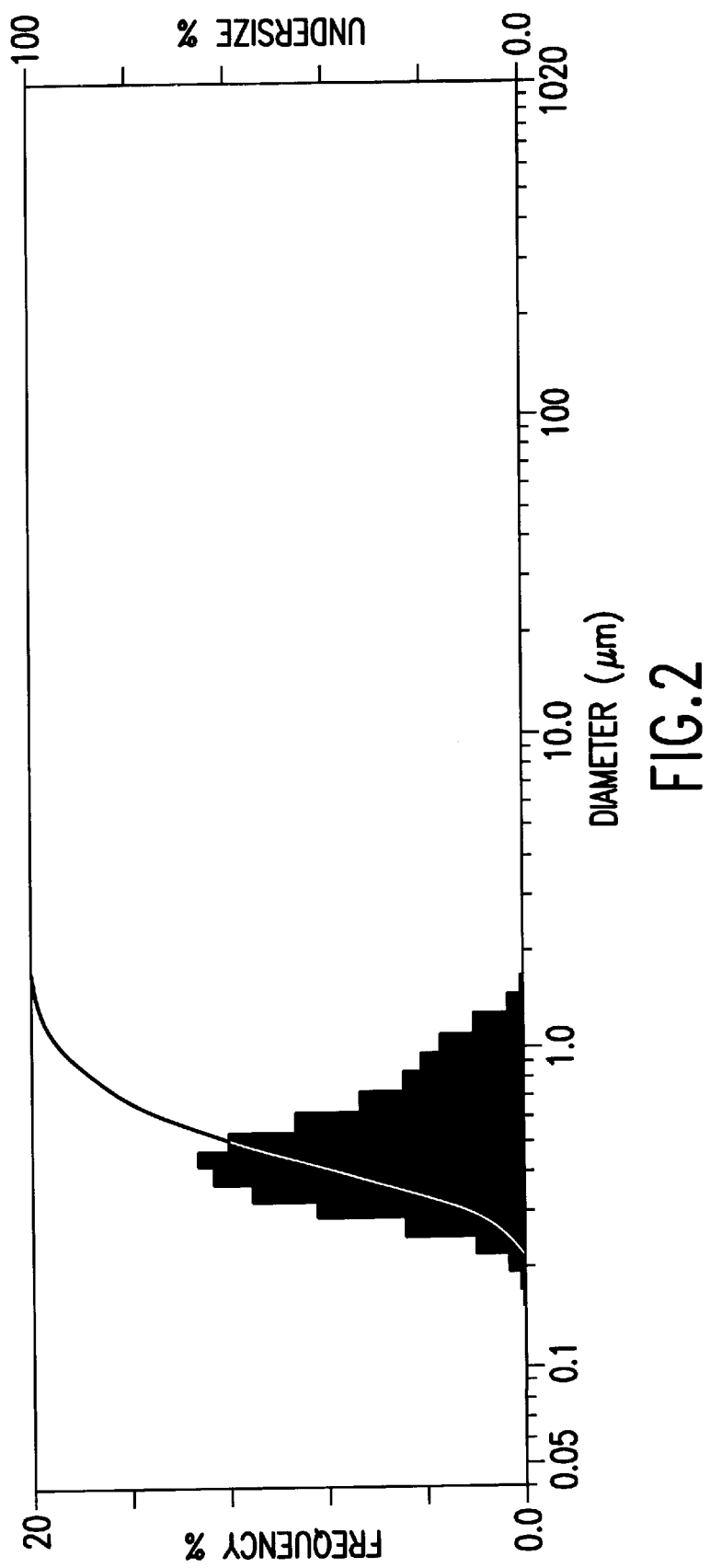
FIG. 2 is a graph of the particle size distribution of milled solid particles of activated carbon in alum solution.

FIG. 2 is a graph of frequency versus diameter of the particle size distribution in microns of 7.5% activated carbon (Norrit Hydrodarco C) suspension after milling for forty-five minutes. The average particle size is 0.552 micron. As shown in Table II, 92.74% of the milled particles have a particle size of about 1 micron or less, and all of the particles had a particle size of 1.73 microns or less.

The milled charcoal suspensions of the invention were also measured for viscosity, density and pH. Viscosity was determined using a Brookfield viscometer after spinning with a No. 3 spindle at 60 rpm for 10 minutes. The results are given below in Table III.

TABLE III

| Carbon Conc. | Grade | Viscosity Cp | pH | Sp. Gravity, Gm/cc |
|---|---|---|---|---|
| 2.5% | HB | 236 | 2.56 | 1.28 |
| | HC | 188 | 2.19 | 1.23 |
| | HR | 201 | 2.08 | 1.29 |
| 5.0% | HB | 858 | 2.02 | 1.31 |
| | HC | 1100 | 2.32 | 1.35 |
| | HR | 770 | 2.48- | 1.27 |
| 7.5% | HC | — | 2.44 | 1.30 |

Viscosity and density of these suspensions are such that they should be pumpable using conventional pumping equipment. One such pump is an air operated diaphragm pump manufactured by Weldon (Grand Terrace, Calif.).

The stable, milled carbon-alum suspension exemplified above was used to treat river water, using alum alone as a control. The alum dose was 133 ppm on a liquid basis. The emulsions gave equally satisfactory results at a dosage about 20% lower.

Water treated with the alum-carbon suspensions of the invention formed a floc much faster than when treating the water using alum alone, and the floc settled out of the water at a faster rate to give a very clear supernatant solution. The supernatant liquid treated with alum alone had a yellowish tinge, generally indicating that some organic materials remained in the water. The water treated with activated carbon-alum suspension was clear, and had a slightly grey tinge, typically observed after treatment of water with activated carbon.

In addition, conventional additives that serve the intended purpose of forming a stable suspension of the invention, such as organic polymers and calcium chloride, can be added to the insoluble solid particle-metal salt stable suspensions of the present invention. However, it is the milling of the particles that contributes most significantly to the stability of the suspensions.

Other solid suspension agents mentioned hereinabove such as silica, synthetic zeolite, bentonite clay and the like having a small (about 1 micron) particle size can also be used independently, or added in combination, to activated carbon suspensions. The most suitable formulation of activated carbon or a solid combination will depend on the relative amount and type of organic impurities in the water to be treated and the ultimate use of the treated water. While the contemplated particle size of solids employed in the suspension of the invention are usually those on the order of about 1 micron, the use of a larger particle size, i.e., on the order of 15–20 microns, although relatively less efficient, is not precluded.

Milling was also compared to high pressure homogenization to reduce the average particle size. Two grades of activated carbon, Hydrodarco B and C, were suspended in water at 1 and 2.5% by weight concentration and homogenized at 7000 psi using a Manton Gaulin Homogenizer made by Gaulin of Boston, Mass. The particle size distribution of single and double pass homogenized solutions are shown in Table IV below.

TABLE IV

| Activated carbon conc | 1% single | 1% double | 2.5% single | 2.5% double |
|---|---|---|---|---|
| Number of passes thru the homogenizer | | | | |
| Av. Part. Size, microns | 20.4 | 21.8 | 20.7 | 18.2 |
| % particles less than 44 microns | 80.9 | 78.6 | 79.9 | 87.2 |
| % particles less than 10 micron | 30.1 | 27.3 | 29.5 | 31.5 |

Comparison of the particle size distribution of the suspension and starting activated carbon powder showed that there was no significant difference between the average particle size of homogenized and unhomogenized suspensions. Also a double pass versus a single pass through a homogenizer does not reduce the particle size of the activated carbon significantly.

The carbon particles as above settled out of the alum solution to a substantial extent in 2–3 days and settling was observed within minutes. Thus homogenization alone will not reduce the particle size of the activated carbon sufficiently to form a stable suspension.

In addition to the particle size decrease with increased milling time, the stability of the present suspensions is enhanced by a maximum concentration approaching about 10% by weight of solids.

For some applications, the relative concentration (proportion) of the salt solution to solids in the suspension should be reduced, i.e., the solids increased, in order to avoid an adverse condition in the treated water from the metal salt.

Although the invention has been illustrated with particular metal salt solutions and particular solid particles, it will be apparent to those skilled in the art that like results can be had using other metal salt solutions and other insoluble solids, as well as different particle sizes and other concentrations of solid suspension agents in solution. Thus the invention is only to be limited to the scope of the appended claims.

We claim:

1. A method for making a substantially stable suspension consisting essentially of:
   a) forming an aqueous solution from a water soluble acidic metal salt containing about 5–50 percent by weight of said water soluble salt,
   b) suspending about 1–12 percent by weight of acid-insoluble solid particles having a particle size of less than 25 microns in the acidic metal salt solution, and
   c) milling the mixture so that the particle size of said particles is reduced to an average particle size of less than 10 microns.

2. A method according to claim 1 wherein the acidic metal salt is selected from the group consisting of aluminum sulfate, aluminum chloride, polyaluminum chloride, aluminum chlorohydrate having the empirical formula $Al_2(OH)_x Cl_{(6-x)}$ wherein x is greater than 0 and less than 6 and wherein x need not be an integer, polyaluminum silicate sulfate, ferric sulfate, ferrous sulfate and ferric chloride.

3. A method according to claim 1 wherein the acid-insoluble solid particles are selected from the group consisting of activated carbon, bentonite clay, zeolite and silica.

4. A method according to claim 1 wherein the stable suspension is formed by milling the particles to a particle size of about 1 micron.

5. A method for treating surface water to reduce its total organic materials content comprising a) introducing the suspension of claim 1 to the water to be treated to form a floc including the solid particles and organic materials;
b) allowing the floc to settle out of solution; and
c) removing the floc from the water.

6. A method according to claim 5 wherein the acidic metal salt solution is selected from the group consisting of solutions of aluminum sulfate, aluminum chloride, polyaluminum chloride, aluminum chlorohydrate having the empirical formula $Al_2(OH)_x Cl_{(6-x)}$ wherein x is greater than 0 and less than 6 and wherein x need not be an integer, polyaluminum silicate sulfate, ferric sulfate, ferrous sulfate, and ferric chloride.

7. A method according to claim 5 wherein the acidic metal salt is a solution of aluminum sulfate.

8. A method according to claim 5 wherein the acid-insoluble solid particles are selected from the group consisting of activated carbon, silica, zeolite and clay.

9. A method according to claim 8 wherein the acid-insoluble solid particles are activated carbon particles.

10. A method according to claim 8 wherein the solid particles are activated carbon particles having a BET surface area in the range of about 500 to 2000 $m^2/gm$.

11. A method according to claim 5 wherein a nonionic surfactant is added to the suspension of metal salt and finely divided solid particles.

12. A stable aqueous suspension of an acidic metal salt solution and acid-insoluble solid particles produced by the method of claim 1 and having a solid particle content of from 3 to 10 percent by weight, said solid particles having a particle size of about 10 microns or less.

13. A stable aqueous suspension according to claim 12 wherein the solid particles have a particle size of about 1 microns or less.

14. A stable suspension according to claim 12 wherein the acidic metal salt is aluminum sulfate.

15. A stable suspension according to claim 12 wherein the acid-insoluble solid particles include activated carbon.

16. A stable suspension according to claim 12 wherein the metal salt is a combination of two or more acidic metal salts.

17. A stable suspension according to claim 12 wherein the solid particles include two or more acid-insoluble solid materials.

18. A stable suspension according to claim 12 wherein the metal salt is a combination of two or more acidic metal salts and the acid-insoluble solid particles include activated carbon and another solid material.

19. A method for treating surface water to reduce its total organic materials content comprising:
   a) making a substantially stable suspension, said making step consisting essentially of
      i) forming an aqueous solution from a water soluble acidic metal salt containing about 5–50 percent by weight of said water soluble salt,
      ii) suspending from about 1–12 percent by weight of acid-insoluble solid particles having a particle size of less than 25 microns in the acidic metal salt solution,
      iii) adding a nonionic surfactant to the mixture resulting from steps (i) and (ii), and
      iv) milling the mixture resulting from step (iii) so that the particle size of said particles is reduced to an average particle size of less than 10 microns;
   b) introducing the substantially stable suspension made in step (a) to the water to be treated to form a floc including the solid particles and organic materials; and
   c) allowing the floc to settle out of the solution; and
   d) removing the floc from the water.

* * * * *